US006265014B1

(12) United States Patent
Gonzalez et al.

(10) Patent No.: US 6,265,014 B1
(45) Date of Patent: Jul. 24, 2001

(54) CANDIED TOMATOES AND PROCESS OF MAKING

(75) Inventors: Carmen Gonzalez, Badajoz (ES); Ginette Harlaux, Beauvais (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/409,092

(22) Filed: Sep. 30, 1999

(30) Foreign Application Priority Data

Oct. 20, 1998 (EP) .................................................. 98203522

(51) Int. Cl.[7] ........................................................ A23L 1/09
(52) U.S. Cl. ........................ 426/639; 426/518; 426/520; 426/524; 426/615
(58) Field of Search .................................... 426/615, 639, 426/518, 520, 524

(56) References Cited

U.S. PATENT DOCUMENTS

| 3,788,862 | 1/1974 | Hoover et al. | 426/177 |
|---|---|---|---|
| 4,041,184 | * 8/1977 | Bonacina | 426/639 |
| 4,542,033 | * 9/1985 | Agarwala | 426/639 |

FOREIGN PATENT DOCUMENTS

| 663 152 | 7/1995 | (EP) . |
|---|---|---|
| 2 682 856 | 4/1993 | (FR) . |
| 2 754 149 | 4/1998 | (FR) . |
| 2 757 020 | 6/1998 | (FR) . |
| 92/10940 | 7/1992 | (WO) . |

OTHER PUBLICATIONS

Givens, M., Modern Encyclopedia of Cooking J.G. Ferguson Publishing Co., Chicago, p. 1386, 1969.*
The Gourmet Cookbook, Gourmet Distributins Corp., N.Y, p. 478, 1950.*

* cited by examiner

Primary Examiner—Helen Pratt
(74) Attorney, Agent, or Firm—Pennie & Edmonds LLP

(57) ABSTRACT

The invention relates to a process for the preparation of candied tomato pieces, in which tomatoes are peeled and cut into pieces, the pieces are sprinkled with a mixture based on sugar and salt, and then cooked. The invention also relates to candied tomato pieces prepared according to the process and food products containing the candied tomato pieces.

9 Claims, No Drawings

CANDIED TOMATOES AND PROCESS OF MAKING

TECHNICAL FIELD

The subject of the present invention is a process for the preparation of candied tomato pieces, candied tomato pieces, and food products containing the candied tomato pieces.

BACKGROUND ART

It is generally known to prepare candied tomatoes. CN 88108671 describes a process for the manufacture of candied tomatoes in which the tomatoes are washed, prepared in a syrup, candied and then cooked before being packaged.

Moreover, HU 863805 describes a process for the preservation of green tomatoes, in which the green tomatoes are peeled, cut into pieces, treated with steam in a bath containing acetic acid, and then soaked in a syrup containing 50% sugar and flavoring agents at 80° C.

These prior art processes prepare candied tomatoes by immersing the candied tomato pieces in a sterilized syrup. The immersion of the candied tomatoes in a soaking stage causes part of the flavor of the tomatoes to be lost.

The aim of the present invention is to provide a quick process that makes it possible to obtain individual pieces of candied tomatoes without causing part of the flavor to be lost.

SUMMARY OF THE INVENTION

The present invention provides a process for the preparation of candied tomato pieces comprising the steps of peeling tomatoes, cutting the peeled tomatoes into pieces, sprinkling the tomato pieces with a mixture comprised of sugar and salt in an amount sufficient to improve candying when the tomatoes are cooked, and cooking the tomato pieces so as to obtain candied tomato pieces. The tomato pieces can be cooked at about 180–250° C. for about 3 to 15 minutes. The starting tomato pieces can be fresh or frozen. The process may further include the steps of cooling the tomatoes to room temperature after they are cooked and individually deep-freezing the candied tomato pieces.

The mixture based on sugar and salt may contain, relative to the quantity of tomatoes, about 0.5 to 2 percent salt and about 2 to 5 percent sugar. Furthermore, the mixture based on sugar and salt may also include, relative to the quantity of tomatoes, about 0.05 to 0.2 percent calcium chloride to preserve and reinforce the texture of the candied tomatoes and about 0.5 to 0.2 percent ascorbic acid to maintain the color and taste of the candied tomatoes or any herbs and spices which are added to flavor the tomato pieces.

The invention also relates to candied tomato pieces obtained by according to the process. The water loss of the candied tomato pieces can be about 4 to 10 percent relative to the water content of the tomatoes at the start.

The invention further relates to a food product comprising the candied tomato pieces. The food product can be a sauce, a topping, a pizza, a snack, or a prepared meal.

DETAILED DESCRIPTION OF THE PREFERRED EMBODIMENTS

The process for preparing candied tomato pieces according to the present invention comprises cutting peeled tomatoes into pieces, sprinkling a mixture based on sugar and salt onto the pieces, cooking the pieces at a temperature of about 180–250° C. for 3–15 minutes, and preferably 160–220° C. for about 8–20 minutes, to obtain candied tomato pieces.

Surprisingly, it has been observed that the process of the present invention makes it possible to obtain candied tomato pieces having a nice red color and having a good taste. These candied tomato pieces can be easily frozen, without water being discharged after defrosting.

Thus, in the process for the preparation of candied tomato pieces according to the present invention, peeled tomatoes are cut into pieces of about 3–8 $cm^3$.

If frozen tomatoes are used to carry out the process according to the invention, 5–8 $cm^3$ pieces are preferably cut, because the shrinkage of these tomato pieces during the cooking stage is greater.

The tomato pieces are then sprinkled with a mixture based on sugar and salt. This mixture makes it possible to improve candying during the subsequent cooking stage. Preferably, this mixture contains, relative to the quantity of tomatoes, about 0.5 to 2 percent salt and about 2 to 5 percent sugar.

It is possible to add to this mixture, relative to the quantity of tomatoes, 0.05 to 0.2 percent calcium chloride, so as to preserve and reinforce the texture of the candied tomato pieces, and about 0.05 to 0.2 percent ascorbic acid, so as to maintain the color and the taste of the candied tomato pieces. The ascorbic acid acts as an antioxidant.

It is also possible to add herbs and spices, so as to flavor the tomato pieces, if desired.

The tomato pieces are then cooked at about 160–220° C. for 8–20 min, so as to obtain candied tomato pieces. The cooking is carried out in a medium that has good ventilation and some moisture, so that the candying of the tomato pieces occurs without the pieces becoming dry and burned during the cooking stage. Preferably, the moist temperature during the cooking stage is about 70–90° C. The tomato pieces can be cooked, for example, in a continuous cooking oven equipped with a grid conveyor on which the tomato pieces are placed.

The candied tomato pieces thus prepared can be rapidly cooled to room temperature with pulsated air, before carrying out an individual quick deep-freezing. The deep-freezing can be performed, for example, using a deep-freezer such as the "flowfreezer" marketed by the company Friscoscandia. It is preferable to carry out an individual quick deep-freezing of the candied tomato pieces.

The subject of the present invention is also the candied tomato pieces obtained using the process. Preferably, these candied tomato pieces exhibit a water loss of about 4 to 10 percent, relative to the water content of the tomatoes at the start. It is possible to use tomatoes having a dry matter content of about 4 to 6 percent, so as to produce candied tomato pieces having a dry matter content of about 10 to 16 percent.

Finally, these candied tomato pieces can be used for the manufacture of a food product. It is possible, for example, to use the candied tomato pieces for the manufacture of sauces, for the manufacture of toppings, for pizza, for snacks, or for prepared meals.

EXAMPLES

The candied tomatoes, the process for the preparation of candied tomatoes, and their use in food products are described in greater detail with the aid of the following examples. In these examples, the percentages are given by weight unless otherwise stated.

Example 1

Candied tomato pieces were prepared according to the process of the present invention.

To do this, 10 kg of tomatoes were washed and peeled before being cut into 4–6 cm³ dice.

The tomato dice thus prepared were placed on a grid and were sprinkled with 300 g of a mixture consisting of 100 g of salt and 200 g of sugar.

The sprinkled tomato dice were then cooked at 220° C. for 10 min, so as to produce candied tomato pieces having a pleasant texture and a nice red color.

The candied tomato pieces thus produced were rapidly cooled to room temperature with pulsated air, and subjected to individual quick deep-freezing to −20° C.

Example 2

The influence of the mixture based on sugar and salt on the quality of the candied tomatoes was evaluated.

To do this, 10 kg of tomatoes were washed and peeled before being cut into 4–6 cm³ dice.

These tomato dice were divided into two batches. One of the two batches (Batch No. 1) was placed on a grid and the tomato dice were cooked at 220° C. for 10 min without the tomato dice being sprinkled with a mixture based on sugar and salt beforehand, so as to produce candied tomato pieces. The other batch (Batch No. 2) was placed on a grid and the tomato dice were sprinkled with 150 g of mixture consisting of 50 g of salt and 100 g of sugar before being cooked as described above.

Furthermore, two additional batches (Batch No. 3 and Batch No. 4) of candied tomato pieces were prepared in the manner described above, except that the tomatoes were not peeled. For Batch No. 3 the tomato dice were cooked without being sprinkled with a mixture based on sugar and salt before cooking. For Batch No. 4 the tomato dice were sprinkled with the same mixture based on sugar and salt as was used for Batch No. 2 before being cooked.

The proportion of tomato pieces burned during the cooking stage were determined. The results are provided below in Table I.

TABLE I

| Batch | Cooking temperature (° C.) | Cooking time (min) | Proportion of tomato pieces burned (%) |
| --- | --- | --- | --- |
| Batch No. 1 | 220 | 10 | 58.6 |
| Batch No. 2 | 220 | 10 | 52.8 |
| Batch No. 3 | 220 | 10 | 55.2 |
| Batch No. 4 | 220 | 10 | 55.9 |

Legend:
Batch No. 1 peeled tomatoes
Batch No. 2 peeled tomatoes + mixture based on sugar and salt
Batch No. 3 unpeeled tomatoes
Batch No. 4 unpeeled tomatoes + mixture based on sugar and salt The results provided in Table I demonstrate that when the candied tomato pieces are prepared according to the process of the invention, that is to say if the tomatoes are peeled and sprinkled with a mixture based on sugar and salt, candying is performed during the cooking stage without the proportion of burned tomato pieces being too high.

Example 3

Candied tomato pieces produced according to the present invention were used for the preparation of a pizza.

To do this, a mixture comprising, relative to the total weight of the mixture, 45% of candied tomatoes, 10% of mozzarella-type cheese, 10% of chorizo sausage, 15% of onions, 10% of anchovy and 10% of olives, was placed on a pizza dough. The pizza thus produced was cooked in a traditional oven at 170° C. for 20 min. A pizza with Italian flavors having a good tomato taste was produced.

What is claimed is:

1. A process for the preparation of candied tomato pieces comprising the steps of:

peeling tomatoes;

cutting the peeled tomatoes into pieces;

sprinkling the tomato pieces with a mixture comprised of about 2 to about 5 percent sugar and about 0.5 to about 2 percent salt, relative to the quantity of tomatoes; and cooking the tomato pieces at a temperature of about 180° C. to about 250° C. for about 3 minutes to about 15 minutes.

2. The process of claim 1 wherein the candied tomato pieces are frozen.

3. The process of claim 1 further comprising cooling the tomatoes to room temperature after they are cooked and individually deep-freezing the candied tomato pieces.

4. The process of claim 1 wherein the mixture based on sugar and salt further comprises, relative to the quantity of tomatoes, about 0.05 to 0.2 percent calcium chloride to preserve and reinforce the texture of the candied tomatoes and about 0.5 to 0.2 percent ascorbic acid to maintain the color and taste of the candied tomato pieces.

5. The process of claim 1 wherein the mixture based on sugar and salt further comprises herbs or spices to flavor the tomato pieces.

6. Candied tomato pieces obtained by the process of claim 1.

7. The candied tomato pieces of claim 6, wherein the water loss of the candied tomato pieces is about 4 to 10 percent relative to the water content of the tomatoes at the start.

8. A food product comprising the candied tomato pieces of claims 6.

9. The food product of claim 8 wherein the food product is a sauce, a topping, a pizza, a snack, or a prepared meal.

* * * * *

UNITED STATES PATENT AND TRADEMARK OFFICE
CERTIFICATE OF CORRECTION

PATENT NO. : 6,265,014 B1
DATED : July 24, 2001
INVENTOR(S) : Gonzalez et al.

Page 1 of 1

It is certified that error appears in the above-identified patent and that said Letters Patent is hereby corrected as shown below:

<u>Column 4,</u>
Line 52, change "of claims 6" to -- of claim 6 --.

Signed and Sealed this

Nineteenth Day of March, 2002

Attest:

JAMES E. ROGAN
*Director of the United States Patent and Trademark Office*

*Attesting Officer*